Figure 1:
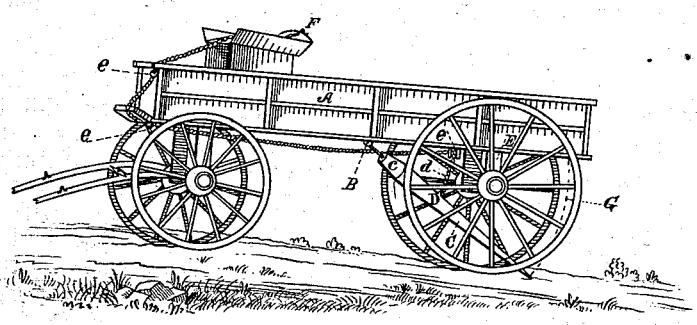

W. FLETCHER.
Brake for Vehicles.

No. 159,543. Patented Feb. 9, 1875.

Witnesses:
H. E. Metcalf
Sam'l C. Oliver

Inventor:
William Fletcher,
Per C. A. Shaw
Atty.

UNITED STATES PATENT OFFICE.

WILLIAM FLETCHER, OF BOSTON, MASSACHUSETTS.

IMPROVEMENT IN BRAKES FOR VEHICLES.

Specification forming part of Letters Patent No. 159,543, dated February 9, 1875; application filed November 25, 1874.

*To all whom it may concern:*

Be it known that I, WILLIAM FLETCHER, of Boston, in the county of Suffolk, State of Massachusetts, have invented a certain new and useful Improvement in Wagon-Dogs, of which the following is a description sufficiently full, clear, and exact to enable any person skilled in the art or science to which my invention appertains to make and use the same, reference being had to the accompanying drawing, forming a part of this specification, in which—

Figure 1 is a side elevation, showing a carriage provided with my improvement.

My invention relates more especially to carriages or vehicles intended for business purposes, such as express-wagons, trucks, stage-coaches, &c.; and consists in a trig or dog, arranged and operated in a novel manner, as hereinafter more fully set forth and claimed, the object being to afford a sure and convenient means of dogging or securing the vehicle in any desired position when passing up a hill or incline.

In the drawing A represents the body of the carriage, and C the dog or trig, which is jointed at one end to the under side of the body by the eyebolts B, its other end resting on the ground, as shown. Attached to the dog C, by the staple D, there is a cord, *d*, which passes through the sheave or block E and guides *e e* to the seat of the carriage, where it is secured by means of the hook F.

From the foregoing the nature and operation of my invention will be readily understood by all conversant will such matters. In using my improvement to prevent the carriage to which it is attached from running down hill when stopped, it is only necessary to detach the hook F and permit the dog or trig C to fall to the ground, the trig being elevated again, as shown by the dotted lines G, when the carriage is started up.

It will be obvious that the dog may be jointed to the axle of the wagon, or to some other part of the body, without departing from the spirit of my invention; also, that the arrangement of the cord is such that the dog may be readily operated by the driver without leaving his seat.

Having thus explained my invention, what I claim is—

The dog C, in combination with body A, eyebolts B, cord *d*, hook F, sheave E, and guides *e e*, substantially as and for the purpose set forth.

WILLIAM FLETCHER.

Witnesses:
   H. E. METCALF,
   SAML. C. OLIVER.